(12) United States Patent
Bristow

(10) Patent No.: US 6,468,616 B1
(45) Date of Patent: Oct. 22, 2002

(54) JOINT APPARATUS AND METHOD

(76) Inventor: Michael M. Bristow, 1442 Knollwood Pl., Chula Vista, CA (US) 91915

( * ) Notice: Subject to any disclaimer, the term of this patent is extended or adjusted under 35 U.S.C. 154(b) by 0 days.

(21) Appl. No.: 09/825,762

(22) Filed: Apr. 4, 2001

(51) Int. Cl.[7] ................................................. B32B 3/10
(52) U.S. Cl. ................ 428/61; 52/587.1; 52/582.2; 52/582.1; 52/584.1
(58) Field of Search ............................. 428/61; 52/587.1, 52/582.2, 582.1, 584.1, 715; 403/DIG. 12, DIG. 13

(56) References Cited

U.S. PATENT DOCUMENTS 4,422,277 A * 12/1983 Bains ........................ 52/584.1

* cited by examiner

Primary Examiner—Alexander S. Thomas
(74) Attorney, Agent, or Firm—Brown, Martin, Haller & McClain, LLP

(57) ABSTRACT

A joint apparatus for joining two objects together with end faces in face-to-face engagement includes first and second flat elongate plates for attachment to faces of the respective objects adjacent the end face. Each plate has a first side edge for facing the first side edge of the other plate when secured to the respective object, and the first side edges each have a series of alternating tongues and recesses positioned for alignment with the recesses and tongues of the other plate, respectively. The plates are positioned on the respective objects such that the tongues project out from the end face of the object and engage in the recesses of the other plate when the end faces are abutted, in a zipper-like fashion. The plates may be temporarily clamped together while the tongues are secured to the face of the opposing object, thereby forming the joint.

39 Claims, 4 Drawing Sheets

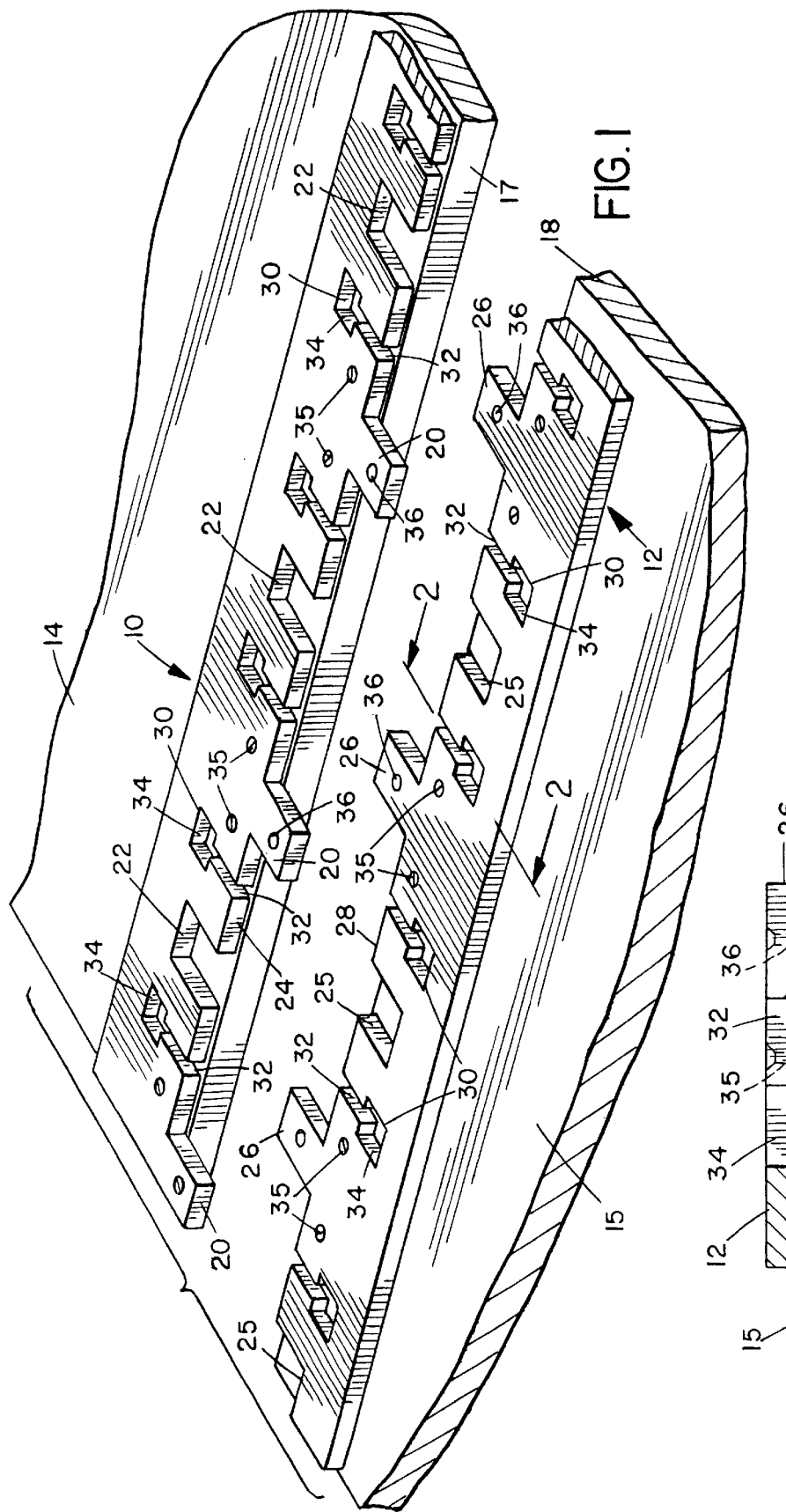

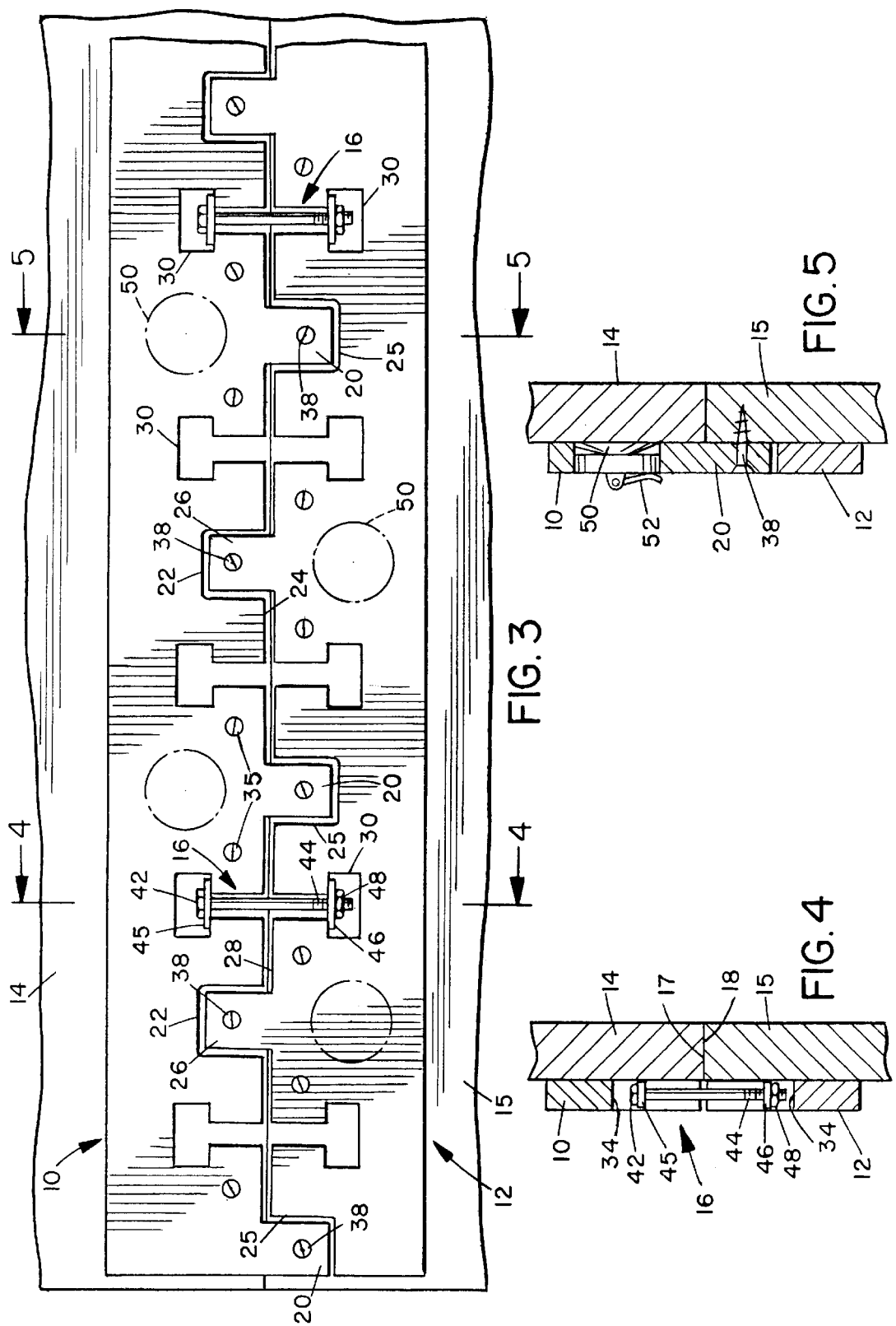

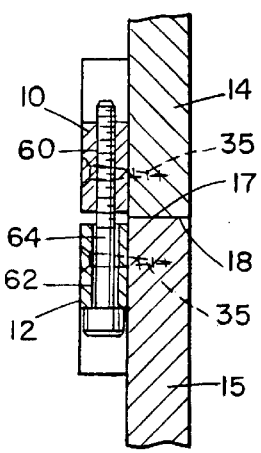
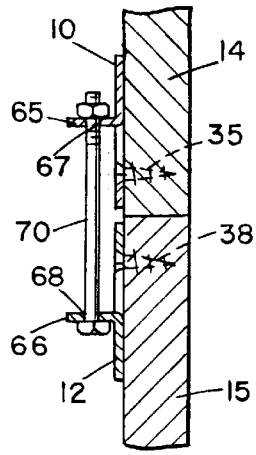
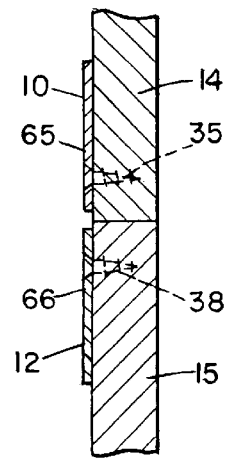
FIG.9  FIG.10  FIG.11
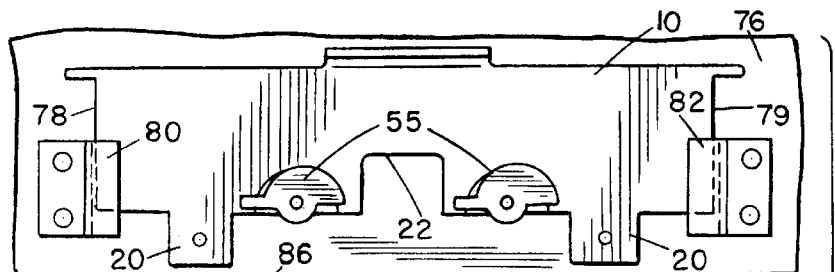
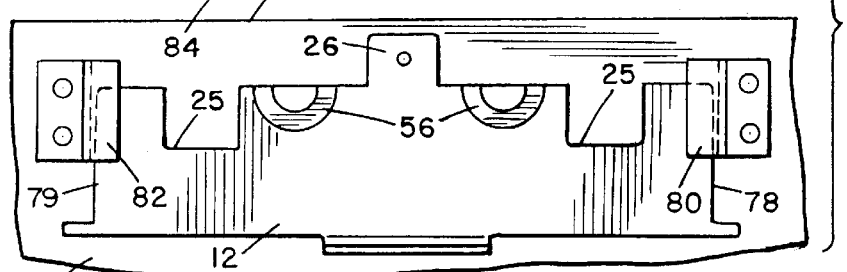
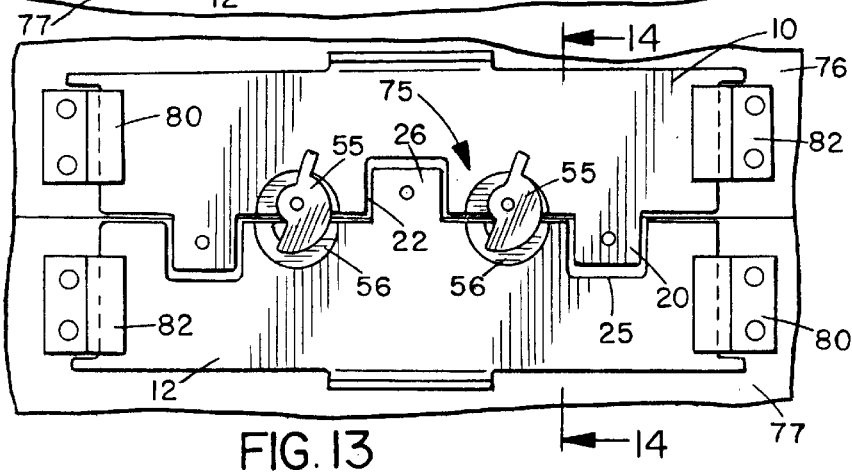
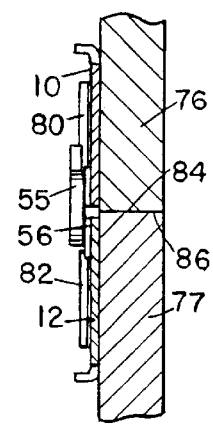
FIG.12
FIG.13
FIG.14

JOINT APPARATUS AND METHOD

BACKGROUND OF THE INVENTION

The present invention is concerned with a method and apparatus for joining together two or more objects, as is often required in cabinet, other furniture and fixture making, solid surface fabrications, and manufacturing in general.

It is often necessary to join two or more objects or pieces together in cabinetry, furniture making, fixture making, solid surface fabrications and the like. This is a common task at a job site during installation. There are many methods of making such joints. The most common method involves first machining and installation of a so-called "biscuit spline" to ensure that front and back movement of two panels being joined is solid. Secondly, a mechanical fastener, such as a tight joint fastener, dog-bone fastener, or draw bolt or the like, is routed into the back surfaces of the panels. A series of such fasteners are spaced apart at approximate intervals of six to twelve inches along the joint. A template is used to rout directly into the panel material. Next, the mechanical fasteners are all tightened as the alignment of the panels is fine tuned. Usually, the mechanical fasteners alone are left to hold the panels together. This means that the fasteners must be installed to a very high torque rating, which can cause panel failure at the route. The fasteners must be permanently installed, and a separate plate is seldom used to bridge and strengthen the joint, due to the added time and expense involved.

There are some inherent problems with this method and other similar methods of joining two items. One major issue is that of health. The routing of the panels to receive the mechanical fasteners produces a large amount of dust. Sawdust or resin dust is an occupational hazard in carpentry and other similar professions, and exposure to such materials should be minimized wherever possible. The time needed to biscuit joint and rout two panels to receive fasteners on site is slow, and creates a significant amount of airborne sawdust or resin dust particles. Routing in the field produces both dust and added noise. If a factory rout is produced, then all possible joints must be accounted for in advance. Some factory made routs will then not be required, and will need to be cut off and discarded at the installation site when the ends do not need to be joined. Thus, there are disadvantages in both on-site and factory made routs. Additionally, the mechanical fasteners are not removable due to the fact that they alone usually hold the joint together. This method of joinery can also not be used on an exposed surface, unless the appearance of the exposed routs and fasteners is not objectionable.

SUMMARY OF THE INVENTION

It is an object of the present invention to provide a new and improved joint apparatus and method for joining two or more objects or panels.

According to one aspect of the present invention, a joint apparatus for joining two objects with adjacent end faces of the objects in face-to-face engagement is provided, which comprises a first elongate, generally flat plate for securing to a face of one of the objects adjacent the end face to be joined, and a second elongate, generally flat plate for securing to a face of the other object adjacent the end face to be joined, each plate having a side edge for facing the side edge of the other plate when the plates are secured to the respective objects, each side edge having a series of alternating inwardly directed recesses and outwardly projecting tongues, the tongues in the first plate being positioned for mating engagement in the recesses in the second plate and the tongues in the second plate being positioned for mating engagement in the recesses in the first plate when the plates are secured to the objects and the end faces of the objects are placed together.

Once the tongues and recesses are engaged, each tongue may be suitably secured to the underlying surface of the other object in order to secure the joint, since each plate will be secured to both objects. Mechanical fasteners may be used to temporarily clamp the plates together while the tongues are secured. In one example, each side edge may have a fastener receiving indent located between one or more adjacent tongues and recesses for alignment with a corresponding fastener receiving indent in the side edge of the other plate. Suitable fasteners may be placed in each aligned pair of indents for clamping the two plates, and the objects to which they are secured, together. Alternatively, suitable clamping devices may be mounted on top of the two plates adjacent the end faces to be joined, such as sash lock type fasteners, or the plates may have aligned, upstanding ears or tabs through which nut and bolt or other fasteners extend in order to hold the plates together.

The plates are each secured to a face of the respective object to be joined, adjacent and perpendicular to the end face of the object which is to be pulled into face-to-face engagement with the end face of the other object, with the tongues projecting outwardly from the end face. The two objects can then be brought together such that the tongues engage in the respective recesses of the other plate. Suitable fasteners can be placed in aligned pairs of fastener receiving indents or routs, and tightened to pull the joint together. In an exemplary embodiment, each tongue has an opening for receiving a fastener for securing each plate to the other half or object of the joint. Each plate also may have spaced openings for receiving fastener screws or the like for securing the plate to the object at the desired location. Alternatively, the plate may be secured to the respective objects by suction cups, adhesive, or other fasteners.

The two plates making up the joint apparatus may be made of any suitable material such as wood or other wood-based products metal plate or sheet material, or synthetic materials such as resin-based solid surfacing materials, for example Corian®. The plates may be used to join objects such as panels, tables, shelving, cabinets, or the like, which may be of wood, synthetic material, metal or the like. The plates may be joined to the respective substrates of the objects to be joined by any suitable means, such as mechanical fasteners, nails, staples, or with adhesives to bond to the substrate. The clamping devices may be removed when the plates are completely secured to the two objects.

The apparatus of this invention is portable, dust-free, and self-aligning, decreasing the labor time and expense of joining two objects. It avoids the need for on-site routing of panels or faces of objects to be joined, since all necessary routs are pre-formed in the joint plates. This avoids marring of the faces and also eliminates hazardous dust which is produced in such routing. It also eliminates the need for custom machining or routing of panels either in the factory or on site. Instead, a plurality of joint strips or plates can simply be purchased off-the-shelf for suitable installation wherever a joint is needed.

According to another aspect of the present invention, a method of joining two objects with end faces of the objects in face-to-face engagement is provided, which comprises the steps of:

taking first and second elongate, generally flat joint plates each having a side edge having a series of alternating tongues and recesses;

securing the first joint plate to a face of a first object adjacent an end face to be placed face-to-face with an end face of a second object, such that the side edge faces outwardly and the spaced tongues project outwardly from the end face in a direction perpendicular to the end face;

securing the second joint plate to a face of a second object adjacent an end face to be placed face-to-face with an end face of the first object, such that the side edge faces outwardly and the spaced tongues project outwardly from the end face in a direction perpendicular to the end face;

bringing the two objects towards each another with their end faces facing one another such that the tongues on the first plate enter aligned recesses in the second plate and the tongues on the second plate enter aligned recesses in the first plate, and securing each tongue on the first plate to an underlying surface portion of the second object and securing each tongue on the second plate to an underlying surface portion of the first object;

whereby the two objects are aligned and secured together at the joint formed by the two plates.

In an exemplary method, each plate has a series of spaced fastener receiving indents or routs along its side edge, with each indent located between a respective adjacent pair of tongues and recesses, and the spaced fastener receiving indents in the side edge of the first plate are aligned with corresponding fastener receiving indents on the side edge of the second plate. A first half of a fastener is then placed in each fastener receiving indent on the first plate and a second half of the fastener is placed in each fastener receiving indent on the second plate, with the first and second halves of each fastener in loose engagement; and the fasteners are then tightened to draw the two plates together and bring the end faces into face-to-face engagement at the joint.

In an alternative method, two halves of a fastener such as a sash-lock type fastener are secured at spaced intervals on top of the respective plates, and the sash-lock fasteners are secured together to clamp the two plates in position while the tongues are secured to the underlying surface of the two objects to be joined. In another alternative, the plates are provided with a series of aligned, upstanding tabs with fastener openings, and the plates may be secured together by extending bolts through the aligned tabs, and tightening nuts over the projecting ends of the bolts.

The fasteners may be removed after the plates are each secured to both objects, since they will no longer be needed to hold the joint together. The plates may be permanently or temporarily secured in place, depending on whether a permanent or temporary joint is required between the two objects. In one embodiment, the joint apparatus may be used to join two banquet tables together temporarily. In this case, each plate is slidably mounted on a respective table end, and may be moved between a retracted position in which the tongues are hidden, and an extended position in which the tongues project outwardly from the table end for engagement in aligned recesses in the plate mounted on another table end. The two plates may be releasably secured together by sash-lock fasteners or the like.

The method and apparatus of this invention may be used to secure two or more objects together quickly and easily, without requiring any machining or routing of the objects themselves prior to making the joint. The tongue and recess engagement between the two plates ensures proper alignment of the objects to be joined.

The method and apparatus of this invention may be used to secure two or more objects together quickly and easily, without requiring any machining or routing of the objects themselves prior to making the joint.

BRIEF DESCRIPTION OF THE DRAWINGS

The present invention will be better understood from the following detailed description of some exemplary embodiments of the invention, taken in conjunction with the accompanying drawings in which like reference numerals refer to like parts and in which:

FIG. 1 is a perspective view of two separated panels with the joint apparatus according to an exemplary embodiment of the invention attached;

FIG. 2 is an enlarged sectional view taken on line 2—2 of FIG. 1;

FIG. 3 is a top plan view of the joined and clamped panels;

FIG. 4 is a sectional view taken on line 4—4 of FIG. 3;

FIG. 5 is a sectional view taken on line 5—5 of FIG. 3, illustrating an alternative suction cup fastener;

FIG. 9 is a sectional view taken on line 9—9 of FIG. 7;

FIG. 10 is a sectional view taken on line 10—10 of FIG. 8;

FIG. 11 is a view similar to FIG. 10, showing the clamping tabs flattened;

FIG. 12 is a top plan view of two separated panels with concealable joint units attached;

FIG. 13 is a top plan view showing the structure of FIG. 12 joined and clamped; and FIG. 14 is a sectional view taken on line 14—14 of FIG. 13.

DETAILED DESCRIPTION OF THE DRAWINGS

Figure 6:
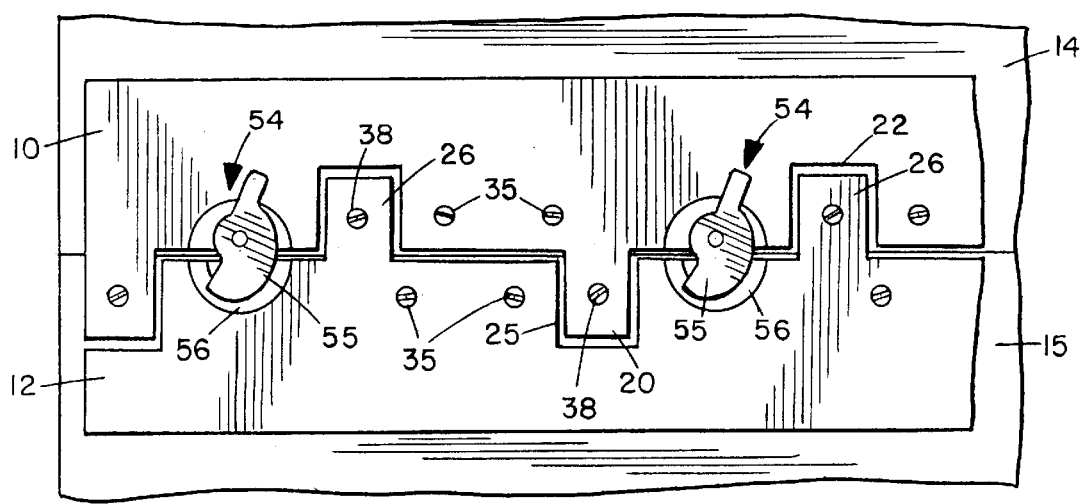
FIG. 6 is a top plan view showing an alternative clamping arrangement.

FIGS. 1 to 4 of the drawings illustrate a joint apparatus and method according to a first embodiment of the invention. The apparatus basically comprises two flat plates or strips 10,12 designed for attachment to two objects to be secured together, such as a first panel 14 and a second panel 15, and a clamping or fastener assembly 16 for securing the plates together. The panels are intended to be secured together in a co-planar manner with their opposing inner edges or end faces 17,18, respectively in abutting, face to face relationship, as indicated in FIG. 4.

The first plate 10 has a series of alternating tongues 20 and recesses 22 along on of its side edges 24, while the second plate has alternating recesses 25 and tongues 26 along the corresponding side edge 28 for alignment with the tongues 20 and recesses 22 in the first plate. Each tongue and recess pair 20,26 and 25,22 is of generally matching shape and dimensions to allow the tongues to mate with the respective opposing recesses. In the illustrated embodiment, the tongue and recess shape is generally square or rectangular, although other shapes, such as elongate shapes with rounded ends, are possible.

Each plate 10,12 also has a series of routed in areas or indents 30 for receiving the clamping assembly 16, each indent being positioned between an adjacent tongue and recess for alignment with a corresponding indent in the other plate. Each indent or area 30 has a narrow neck portion 32 and an enlarged inner portion 34, which may be of any suitable shape, such as square, rectangular, round, or heart-shaped.

The two plates 10,12 are secured to the respective panels 14,15 such that the plate side edges 24,28 are substantially aligned with the respective panel end face 17,18 to be joined, and the tongues 20,26 project outwardly from the respective panel end face, as illustrated in FIG. 1. The plates may be secured to the respective panels by a series of spaced screws 35 extending through holes in each plate into the underlying panel, as illustrated in FIGS. 1 and 2. Alternatively, the plates may be secured by adhesive, staples, or other suitable fasteners.

Each tongue 20,26 is also provided with a screw receiving hole 36, as indicated in FIGS. 1 and 2, in this embodiment. When the two plates are appropriately secured to the respective panels, as in FIG. 1, the panels are brought towards one another with each tongue 20,26 aligned with the appropriate opposing recess 25,22. When the panel end faces 17,18 are abutted as in FIGS. 3 and 4, each tongue will be fully engaged in the appropriate recess, holding the panels against any sideways movement. At this point, the tongues are secured to the underlying panels by screws 38. The two strips or plates 10,12 are then each secured to both panels, thereby securing the panels together with their end faces in face-to-face abutment.

The clamping assembly or fastener mechanism 16 is used to draw the two plates and panels together more readily into the fully mated position of FIG. 3, and to hold the plates together temporarily while the tongues are secured to the underlying panels. Each clamp or fastener assembly 16 comprises a bolt having a head 42 and a threaded shaft 44 extending through a hole in a first clamp plate 45 and a second clamp plate 46, and a nut 48 engaging over the threaded end of shaft 44 on the opposite side of the second clamp plate 46. One such assembly can be placed in some or all of the aligned routed indents 30, as indicated in FIGS. 3 and 4, with the first clamp plate 45 and bolt head 42 engaging in the enlarged area 34 of one indent or routed area on one of the plates, and the second clamp plate 46 and nut 48 engaging in the enlarged area 34 of the aligned, opposing indent 30 in the other plate. The nuts 48 can all then be tightened, pulling the two halves of the joint together until the end faces 17, 18 are in abutment. Once the screws 38 have been installed in each tongue, securing each plate to the opposite panel, the fastener or clamping assemblies 16 are no longer necessary and can be removed and re-used, if desired.

It will be understood that different types of fasteners or securing means may alternatively be used to secure the tongues to the opposing, underlying panels. Instead of fastener screws, the tongues may alternatively be secured by nails, staples, or other mechanical fasteners. Alternatively, they may be secured with adhesive, simply by coating the exposed side portions of the respective panels underlying the respective recesses 22,25 with adhesive prior to engaging the tongues in the respective recesses. The adhesive will then be allowed to dry before removing the clamping assemblies 16.

FIG. 5 illustrates an alternative arrangement for securing the plates 10,12 to the underlying panel, avoiding the need for fastener screws 35 or other mechanical fasteners. In this alternative, a series of suction cups 50 are mounted at spaced intervals across each plate or strip 10,12, for example at the locations illustrated in dotted outline in FIG. 3. Each suction cup 50 may be actuated by a toggle 52 accessible from the top of the respective plate, as indicated in FIG. 5, for example. The plates may be thereby secured to the underlying panel by suction. The suction cups may suitably be used where the plates are to be secured to the underlying panels with adhesive, since they will hold the plates in position while the adhesive dries, and allow the two panels to be drawn together prior to drying of the adhesive.

The particular clamping or fastener assemblies 16 illustrated in FIGS. 1 to 4 are only one possible example of many different alternative mechanisms which may be used to pull the two halves of the joint together. Some of these alternatives are illustrated in FIGS. 6 to 14.

FIG. 6 illustrates an alternative clamping arrangement for the two plates 10,12 which replaces the indents 30 and nut and bolt fastener arrangement 42,44,45,46,48 of FIGS. 1 to 4. The joint apparatus of FIG. 6 is otherwise identical to that of FIGS. 1 to 4, and like reference numerals have been used for like parts as appropriate. In FIG. 5, a series of sash-lock type fastener devices 54 are used to hold the two plates together in proper alignment as each tongue is secured to the underlying panel surface. Each fastener device 54 comprises a cam or hook member 55 rotatably mounted adjacent the side edge of one of the plates 10, and a mating, fixed cam or recessed member 56 mounted in alignment with member 55 on the side edge of the other plate 12. When the tongues and recesses of the two plates are fully mated, as in FIG. 6, the hook members 55 can each be rotated into releasable locking engagement with the cam or recess members 56, in which an inturned lip on the hook member engages under a projecting rim of the recess member to secure the two plates together, as in a conventional window sash lock. Alternative locking mechanisms may be used in place of the sash-lock type fastener, such as a trunk latch, door lock, or the like.

Figure 7:
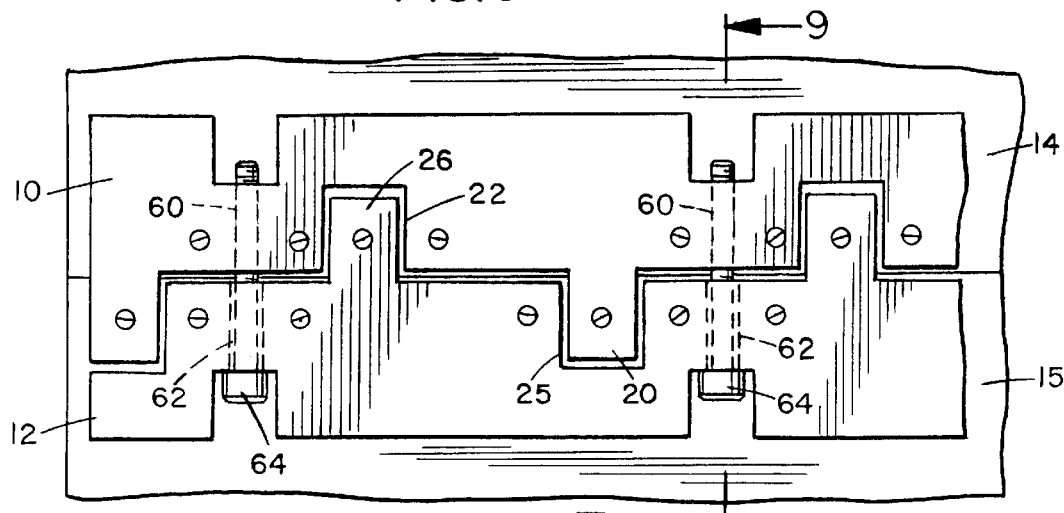
FIG. 7 is a top plan view showing another clamping arrangement.

FIGS. 7 and 9 illustrate another alternative clamping arrangement for holding the two plates together as the tongues are secured to the underlying surfaces of panels 14 and 15. In this arrangement, the plates 10,12 each have a series of spaced through bores 60,62, respectively, extending between the opposite side edges of each plate. The bores 60 and 62 are aligned when the tongues and recesses are engaged as in FIG. 7. A bolt 64 is pre-installed to extend through each aligned pair of bores 60,62, and is in threaded engagement with mating threads in bore 60, as best illustrated in FIG. 9. Thus, the two plates or halves of the joint assembly are linked together prior to attachment to two objects to be joined, such as panels 14,15. On site, the panels or other objects to be joined will be positioned with the edges or end faces 17,18 to be joined in abutment, and the two plates 10,12 will then be placed on the respective panels so as to span the joint as indicated in FIG. 7. Each plate is then secured to the panel 14 or 15 on one side of the joint. The bolts 64 are then tightened to draw the plates and panels together. At this point, the tongues of the respective plates 10,12 are secured to the other panel, 15 or 14, respectively. As in the previous embodiments, the plates can be secured to the panels by any suitable fastener, such as screws, staples, adhesive or the like. This version has the advantage that the placement of the linked halves or plates of the joint is more foolproof. The bolt may have a hex head so that it can be tightened with an Allen wrench.

Figure 8:
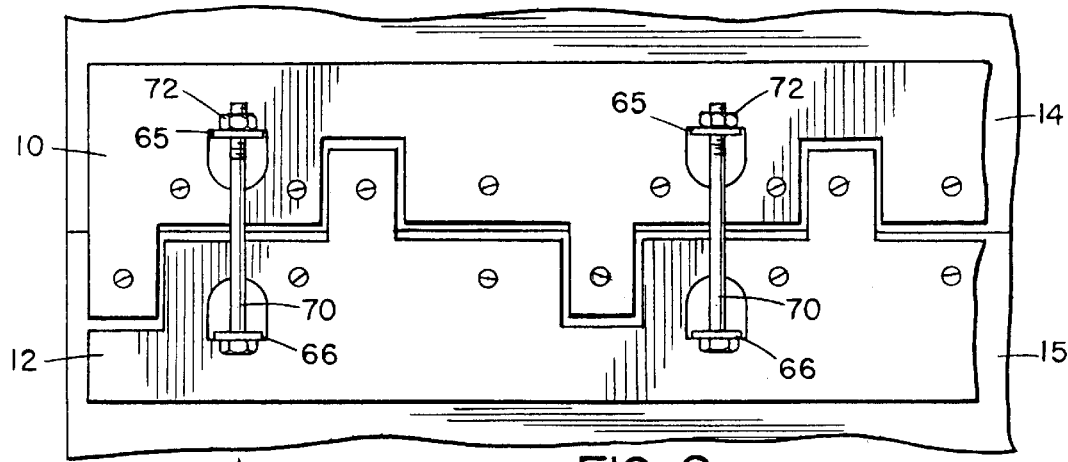
FIG. 8 is a top plan view showing a further clamping arrangement.

FIGS. 8,10 and 11 illustrate another alternative clamping arrangement in which each plate 10,12 is formed by stamping from a relatively thin metal plate, rather than a relatively thick panel of wood or the like as in the previous embodiments. The plate thickness in the previous embodiments is of the order of ½ inch, whereas the thickness of the metal plates 10,12 in FIGS. 8 and 10 is of the order of ¹⁄₁₆ inches or less. Each plate has a series of spaced, bent-up tabs 65,66, respectively, for alignment with the tabs in the other plate when all the tongues and recesses are engaged, as in FIG. 8. The tabs 65 have openings 67 aligned with openings 68 in the opposing tabs, as illustrated in FIG. 10, and a bolt 70 is inserted through each pair of aligned tabs, and secured by a nut 72 engaging over the projecting threaded end of the bolt. Alternatively, each pair of tabs 65,66 may be secured together by means of a ratchet hook clamp which hooks over the openings in each tab and is tightened by a rotatable handle. The ratchet hook clamp will be similar to a larger clamp tool which is commonly used in chain link fencing.

With this clamping arrangement, the plates are held together by the nut and bolt or other fastener extending through the tabs until the tongues are secured to the underlying panel surfaces. The clamping or mechanical fastener devices, such as nuts 72 and bolts 70, are then removed from the tabs, and the tabs can be hammered or bent down flush with the remainder of each plate, as illustrated in FIG. 11. This alternative is particularly suitable for securing together two sections of a countertop designed to sit directly on top of cabinets. The thin metal plates 10,12 can secure two countertop sections smoothly together, and the connected countertop sections can then be secured on the top of the cabinets with the plates facing downwardly, fully concealing the joint.

FIGS. 12 to 14 illustrate another modified embodiment of the invention, in which the joint apparatus 75 comprises plates 10,12 which are slidably mounted on the respective objects to be joined, and are releasably secured together by sash-lock type clamping devices 54 of the same type as illustrated in FIG. 6. The joint apparatus of FIGS. 12 to 14 is otherwise similar to that of the previous embodiments, and like reference numerals are used for like parts as appropriate.

The joint apparatus 75 of FIGS. 12 to 14 is particularly suitable for temporarily connecting together two objects such as banquet tables 76,77. Each plate 10,12 is of relatively thin metal plate material, as in the previous embodiment, and has opposite end edges 78,79 slidably mounted on slide tracks 80,82 on the underside of the respective table top adjacent an end edge 84,86 of the respective table 76,77. Each plate 10,12 is slidable in the respective tracks 80,82 between the retracted position illustrated in FIG. 12, in which each tongue 20,26 is hidden from view underneath the table top, and the extended position of FIG. 13, in which each tongue 20,26 is extended for mating engagement in an opposing recess 25,22, respectively. The rotatable cam members 55 of the sash-lock devices 54 are illustrated in a retracted position in FIG. 12. When the plates are extended into the position of FIG. 13 with the table ends 84 and 86 abutting, the cam members 55 can be rotated from the retracted position of FIG. 12 into the actuated position of FIG. 13, in which they engage under a ledge on the opposing fixed cam or indented member 56, as indicated in FIGS. 13 and 14, simultaneously drawing the table end edges 84 and 86 together.

The slidably mounted plates 10,12 of FIGS. 12 to 14 are particularly suitable for use when two or more objects are to be joined together temporarily. Thus, two banquet tables can be joined together as in FIGS. 13 and 14 to form a single, larger table, and the plates can be readily unfastened and retracted to return them to their hidden state when a larger table is no longer needed.

The method of securing two panels together using the plates and clamping assemblies of this invention is very quick, simple and inexpensive, and does not result in production of sawdust or resin dust. All that is necessary is for the two plates 10,12 to be secured to the respective objects adjacent the respective edges or faces to be mated, with the opposing tongues and recesses appropriately aligned. The two objects are then brought together, with or without the use of clamping assemblies, until the tongues each mate with the opposing recess, and then each tongue is secured to the underlying surface of the opposing object. In this way, each plate is secured to both objects, so that the objects are secured together, and the tongue and groove engagement ensures that the two objects are properly positioned and cannot move relative to one another in a sideways or lateral direction.

Although some exemplary embodiments of the invention have been described above by way of example only, it will be understood by those skilled in the field that modifications may be made to the disclosed embodiments without departing from the scope of the invention, which is defined by the appended claims.

I claim:

1. A joint apparatus for joining two objects with adjacent end faces of the objects in face-to-face engagement, comprising:

a first elongate, generally flat plate for securing to a face of a first object adjacent an end face to be joined;

a second elongate, generally flat plate for securing to a face of a second object adjacent an end face to be joined;

each plate having a side edge for facing the side edge of the other plate when the plates are secured to the respective objects, each side edge having a series of alternating inwardly directed recesses and outwardly projecting tongues, the tongues in the first plate being positioned for mating engagement in the recesses in the second plate and the tongues in the second plate being positioned for mating engagement in the recesses in the first plate when the plates are secured to the objects and the end faces of the objects are placed together; and first securing means for securing the first and second plates to the respective first and second objects; and second securing means for securing each tongue of the first plate to the second object and each tongue of the second plate to the first object.

2. The apparatus as claimed in claim 1, wherein the first and second securing means comprise mechanical fasteners.

3. The apparatus as claimed in claim 2, wherein the mechanical fasteners comprise screws.

4. The apparatus as claimed in claim 1, wherein the first and second securing means comprise adhesive.

5. The apparatus as claimed in claim 1, wherein the first securing means comprises a series of spaced suction cups for securing the first plate to the first object and the second plate to the second object, respectively.

6. The apparatus as claimed in claim 1, including clamping means for releasably securing the two plates together with each tongue engaged with an opposing recess.

7. The apparatus as claimed in claim 6, wherein the clamping means comprises a series of first clamping members mounted in the first plate facing outwardly from said side edge, and a series of second clamping members mounted in the second plate facing outwardly from said side edge for alignment with respective first clamping members, each first clamping member being releasably engageable with a respective second clamping member to form an adjustable length clamp, whereby the clamping members can be adjusted to reduce the length of the clamp and thereby draw the two plates towards one another.

8. The apparatus as claimed in claim 7, wherein each side edge has a fastener receiving indent located between each adjacent tongue and recess for alignment with a corresponding fastener receiving indent in the side edge of the other plate, and each first and second clamping member is mounted in a respective pair of aligned fastener receiving indents.

9. The apparatus as claimed in claim 1, including at least two spaced, releasable clamping devices for releasably securing the first plate to the second plate.

10. The apparatus as claimed in claim 9, wherein each plate has at least two spaced, upwardly directed tabs for alignment with corresponding tabs in the other plate, each tab having an opening, and each clamping device extends through a respective pair of aligned tabs.

11. The apparatus as claimed in claim 10, wherein the clamping device comprises a bolt extending through the aligned tabs and a nut adjustably mounted on the bolt.

12. The apparatus as claimed in claim 9, wherein the releasable clamping devices comprise sash-lock type fasteners.

13. The apparatus as claimed in claim 9, wherein the plates each have a second side edge opposite to said first side edge, and at least two spaced through bores extend between said side edges for alignment with corresponding bores in the other plate, the through bores in one of the plates being threaded, and the releasable clamping devices each comprise a bolt having a threaded shaft extending through a respective pair of aligned through bores and threadably engaged in said threaded bores to releasably secure the plates together.

14. The apparatus as claimed in claim 1, wherein each plate has a thickness of the order of 0.5 inches.

15. The apparatus as claimed in claim 1, wherein each plate is a stamped metal plate.

16. A method of joining two objects with end faces of the objects in face-to-face engagement, comprising the steps of:
   taking first and second elongate, generally flat joint plates each having a side edge having a series of alternating tongues and recesses;
   securing the first joint plate to a face of a first object adjacent an end face to be placed face-to-face with an end face of a second object, such that the side edge faces outwardly and the spaced tongues project outwardly from the end face of the first object in a direction perpendicular to the end face;
   securing the second joint plate to a face of a second object adjacent the end face to be placed face-to-face with the end face of the first object, such that the side edge faces outwardly and the spaced tongues project outwardly from the end face of the second object in a direction perpendicular to the end face;
   bringing the two objects towards each another with their end faces facing one another such that the tongues on the first plate enter aligned recesses in the second plate and the tongues on the second plate enter aligned recesses in the first plate, and
   securing each tongue on the first plate to an underlying surface portion of the second object and securing each tongue on the second plate to an underlying surface portion of the first object;
   whereby the two objects are aligned and secured together at the joint formed by the two plates.

17. A method of joining two objects with end faces of the objects in face-to-face engagement, comprising the steps of:
   taking first and second elongate, generally flat joint plates each having a side edge having a series of alternating tongues and recesses;
   securing the first and second plates loosely together in a co-planar arrangement with the tongues in the first plate engaging the recesses in the second plate and the tongues in the second plate engaging the recesses in the first plate;
   bringing the two objects towards each another with their end faces facing one another until the end faces are in abutment;
   securing the first joint plate to a face of the first object adjacent the end face such that the spaced tongues project outwardly from the end face of the first object and over the second object;
   securing the second joint plate to a face of the second object adjacent the end face such that the spaced tongues project outwardly from the end face of the second object over the first object; and
   securing each tongue on the first plate to an underlying surface portion of the second object and securing each tongue on the second plate to an underlying surface portion of the first object;
   whereby the two objects are aligned and secured together at the joint formed by the two plates.

18. A joint apparatus for joining two objects with adjacent end faces of the objects in face-to-face engagement, comprising:
   a first generally flat plate for securing to a face of a first object adjacent an end face to be joined;
   a second generally flat plate for securing to a face of a second object adjacent an end face to be joined;
   each plate having a first side edge for facing the first side edge of the other plate when the plates are secured to the respective objects; and
   each first side edge having a series of alternating inwardly directed recesses and outwardly projecting tongues, the tongues in the first plate being positioned for mating engagement in the recesses in the second plate and the tongues in the second plate being positioned for mating engagement in the recesses in the first plate when the plates are secured to the objects and the end faces of the objects are placed together and
   at least one first releasable fastener device on the first plate and at least one second releasable fastener device on the second plate for releasable mating engagement with the first fastener device when the tongues and recesses are engaged for releasably securing the first plate to the second plate wherein the first and second fastener devices are permanently secured to the respective plates.

19. A joint apparatus for joining two objects with adjacent end faces of the objects in face-to-face engagement, comprising:
   a first generally flat plate for securing to a face of a first object adjacent an end face to be joined;
   a second generally flat plate for securing to a face of a second object adjacent an end face to be joined;
   each plate having a first side edge for facing the first side edge of the other plate when the plates are secured to the respective objects; and
   each first side edge having a series of alternating inwardly directed recesses and outwardly projecting tongues, the tongues in the first plate being positioned for mating engagement in the recesses in the second plate and the tongues in the second plate being positioned for mating engagement in the recesses in the first plate when the plates are secured to the objects and the end faces of the objects are placed together and at least one first releasable fastener device on the first plate and at least one second releasable fastener device on the second plate for releasable mating engagement with the first fastener device when the tongues and recesses are engaged for releasably securing the first plate to the second plate wherein each plate has at least one fastener receiving opening for alignment with the fastener receiving opening on the other plate when the tongues and recesses are engaged, and the first and second fastener device are engaged through the respective openings.

20. The apparatus as claimed in claim 19, wherein each plate has at least one upstanding tab and the openings are provided in the tabs.

21. The apparatus as claimed in claim 19, wherein each opening comprises a fastener receiving indent in the first side edge of the respective plate.

22. The apparatus as claimed in claim 19, wherein each plate has at least one through bore extending transverse to said first side edge, the through bores comprising said fastener receiving openings.

23. The apparatus as claimed in claim 19, including a slidable mounting assembly associated with each plate for slidably mounting the plate on the respective object for movement between a retracted position in which the tongues do not project beyond the side face of the object to be joined and an extended position in which the tongues project outwardly from the side face for engagement in the recesses in the other plate.

24. The apparatus as claimed in claim 19, wherein each plate comprises an elongate, generally rectangular, planar member having a second side edge opposite the first side edge and opposite end edges.

25. The apparatus as claimed in claim 24, wherein the plate has a thickness in the range from 0.05 inches to 0.75 inches.

26. The apparatus as claimed in claim 19, wherein the plates are of a material selected from the group consisting of wood, wood-based materials, resin-based solid surfacing materials, and metal.

27. The apparatus as claimed in claim 19, wherein each plate has first fastener receiving openings for receiving fasteners for securing the plate to the respective object to be joined.

28. A joint apparatus for joining two objects with adjacent end faces of the objects in face-to-face engagement, comprising:

a first generally flat plate for securing to a face of a first object adjacent an end face to be joined;

a second generally flat plate for securing to a face of a second object adjacent an end face to be joined;

each plate having a first side edge for facing the first side edge of the other plate when the plates are secured to the respective objects; and each first side edge having a series of alternating inwardly directed recesses and outwardly projecting tongues, the tongues in the first plate being positioned for mating engagement in the recesses in the second plate and the tongues in the second plate being positioned for mating engagement in the recesses in the first plate when the plates are secured to the objects and the end faces of the objects are placed together, wherein each plate has first fastener receiving openings for receiving fasteners for securing the plate to the respective object to be joined and the first and second plates have second fastener receiving openings in at least some of the tongues for receiving fasteners for securing the plates to the second and first objects, respectively, when the tongues are received in the opposing recesses.

29. A joint assembly, comprising:

a first object to be joined, the object having a flat face having a perpendicular end face;

a second object to be joined, the second object having a flat face with a perpendicular end face abutting face-to-face with the end face of the first object;

a first generally flat plate secured to the flat face of the first object adjacent the end face to be joined, the plate having a first side edge adjacent the end face;

a second generally flat plate secured to the flat face of the second object adjacent the end face to be joined, the plate having a first side edge adjacent the end face;

each first side edge having a series of alternating inwardly directed recesses and outwardly projecting tongues, the tongues in the first plate extending into the recesses in the second plate and the tongues in the second plate extending into the recesses in the first plate; and a fastener apparatus holding the plates and objects together, wherein the fastener apparatus comprises at least one releasable fastener device releasably securing the first plate to the second plate, wherein the fastener device comprises a sash-lock fastener mechanism having a first part mounted on the first plate and a second part mounted on the second plate.

30. The assembly as claimed in claim 29, wherein the fastener apparatus comprises at least two spaced, releasable fastener devices.

31. The assembly as claimed in claim 29, wherein the objects comprise banquet tables having table tops with upper and lower flat faces, and the plates are mounted on the lower faces of the table tops adjacent said end faces.

32. A joint assembly, comprising:

a first object to be joined, the object having a flat face having a perpendicular end face;

a second object to be joined, the second object having a flat face with a perpendicular end face abutting face-to-face with the end face of the first object;

a first generally flat plate secured to the flat face of the first object adjacent the end face to be joined, the plate having a first side edge adjacent the end face;

a second generally flat plate secured to the flat face of the second object adjacent the end face to be joined, the plate having a first side edge adjacent the end face;

each first side edge having a series of alternating inwardly directed recesses and outwardly projecting tongues, the tongues in the first plate extending into the recesses in the second plate and the tongues in the second plate extending into the recesses in the first plate; and a fastener apparatus holding the plates and objects together, wherein the fastener apparatus comprises at least one releasable fastener device releasably securing the first plate to the second plate, wherein the fastener apparatus comprises a first securing means securing the tongues of the first plate to the flat face of the second object and a second securing means securing the tongues of the second plate to the flat face of the first object.

33. The assembly as claimed in claim 32, wherein the first and second securing means comprise adhesive.

34. The assembly as claimed in claim 32, wherein the first and second securing means comprise mechanical fasteners.

35. A joint assembly, comprising:
- a first object to be joined, the object having a flat face having a perpendicular end face;
- a second object to be joined, the second object having a flat face with a perpendicular end face abutting face-to-face with the end face of the first object;
- a first generally flat plate secured to the flat face of the first object adjacent the end face to be joined, the plate having a first side edge adjacent the end face;
- a second generally flat plate secured to the flat face of the second object adjacent the end face to be joined, the plate having a first side edge adjacent the end face;
- each first side edge having a series of alternating inwardly directed recesses and outwardly projecting tongues, the tongues in the first plate extending into the recesses in the second plate and the tongues in the second plate extending into the recesses in the first plate; and
- a fastener apparatus holding the plates and objects together, wherein the fastener apparatus comprises at least one releasable fastener device releasably securing the first plate to the second plate, wherein each object has a slide mounting device on said flat face and each plate is slidably mounted on the slide mounting device for movement between an extended position in which the tongues project outwardly from said end face and a retracted position in which the tongues are retracted inwardly from said end face and concealed.

36. A method of joining two objects with end faces of the objects in face-to-face engagement, comprising the steps of:
- taking first and second elongate, generally flat joint plates each having a side edge having a series of alternating tongues and recesses;
- securing the first joint plate to a face of a first object adjacent an end face to be placed face-to-face with an end face of a second object, such that the side edge faces outwardly and the spaced tongues project outwardly from the end face in a direction perpendicular to the end face;
- securing the second joint plate to a face of a second object adjacent the end face to be placed face-to-face with the end face of the first object, such that the side edge faces outwardly and the spaced tongues project outwardly from the end face in a direction perpendicular to the end face;
- bringing the two objects towards each another with their end faces facing one another such that the tongues on the first plate enter aligned recesses in the second plate and the tongues on the second plate enter aligned recesses in the first plate;
- securing each tongue on the first plate to an underlying surface portion of the second object and securing each tongue on the second plate to an underlying surface portion of the first object; and
- securing the first plate to the second plate;
- whereby the two objects are aligned and secured together at the joint formed by the two plates.

37. The method as claimed in claim 36, wherein the step of securing the first plate to the second plate comprises temporarily clamping the first and second plates together with a releasable clamping device while the tongues are secured to the underlying surface portions, and releasing the clamping device after the tongues are secured.

38. The method as claimed in claim 37, wherein the step of temporarily clamping the first and second plates together comprises extending a releasable clamping device through aligned openings in bent up tabs in the plates, and including the step of bending the tabs down flush with the upper surface of the respective plates after release and removal of the clamping device.

39. The method as claimed in claim 36, wherein the step of securing the plates to the respective objects comprises slidably mounting the plates on the objects for sliding movement in a direction transverse to the end faces between a retracted position in which the tongues are retracted inwardly from the respective end face and do not engage in the opposing recesses, and an extended position in which the tongues extend outwardly from the respective end face and engage in the recesses in the opposing plate.

* * * * *